United States Patent
Cvejanovic

(10) Patent No.: US 9,025,716 B2
(45) Date of Patent: May 5, 2015

(54) INTER-INTEGRATED CIRCUIT-SLAVE INTERFACE, AND METHOD FOR OPERATING AN INTER-INTEGRATED CIRCUIT-SLAVE INTERFACE

(71) Applicant: Dorde Cvejanovic, Munich (DE)

(72) Inventor: Dorde Cvejanovic, Munich (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 14/096,756

(22) Filed: Dec. 4, 2013

(65) Prior Publication Data

US 2014/0153681 A1 Jun. 5, 2014

(30) Foreign Application Priority Data

Dec. 5, 2012 (DE) .................... 10 2012 222 357

(51) Int. Cl.
*H04L 7/00* (2006.01)

(52) U.S. Cl.
CPC ............ *H04L 7/0041* (2013.01); *H04L 7/0008* (2013.01); *H04L 7/0037* (2013.01)

(58) Field of Classification Search
CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00
See application file for complete search history.

(56) References Cited

U.S. PATENT DOCUMENTS

| | | | | |
|---|---|---|---|---|
| 6,115,318 A * | 9/2000 | Keeth | ..................... | 365/233.13 |
| 6,812,799 B2 * | 11/2004 | Kirsch | .......................... | 331/57 |
| 6,999,547 B2 * | 2/2006 | Braceras et al. | ............... | 375/371 |
| 7,636,001 B2 * | 12/2009 | Kumata | ..................... | 327/158 |
| 8,122,395 B2 * | 2/2012 | Feng | .......................... | 716/100 |

* cited by examiner

*Primary Examiner* — Adolf Dsouza
(74) *Attorney, Agent, or Firm* — Kenyon & Kenyon LLP

(57) ABSTRACT

An I²C interface is provided which has a data line and a clock line, the clock line having a first input buffer, and the data line having a second input buffer and an output buffer, the data line being provided for the transmission of a data input signal and a data output signal, the clock line being provided for the transmission of a clock signal, the clock line having a first delay element, and the data line having a second delay element and a third delay element. A method for operating an I²C slave interface is also provided.

11 Claims, 2 Drawing Sheets

INTER-INTEGRATED CIRCUIT-SLAVE INTERFACE, AND METHOD FOR OPERATING AN INTER-INTEGRATED CIRCUIT-SLAVE INTERFACE

CROSS REFERENCE

The present application claims the benefit under 35 U.S.C. §119 of German Patent Application No. DE 102012222357.6 filed on Dec. 5, 2012, which is expressly incorporated herein by reference in its entirety.

BACKGROUND INFORMATION

Inter-integrated circuit interfaces, hereinafter also referred to as $I^2C$ interfaces, via which a clock generator device, also referred to as master unit or, master, is able to communicate with multiple slave units in serial manner are available. The master transmits a clock signal by way of a clock line, and a data input signal and a data output signal are transmitted via a bidirectional data line. The data line and the clock line are able to be pulled from a low potential (low level) to a high potential (high level), these potentials corresponding to two logic states. The start of a data transmission and the end of a data transmission, and the data as such are encoded by defined states or state changes on the data line with respect to the state that corresponds to the individual state on the clock line. The change in the logic state occurs instantaneously, but in reality, it is represented by non-vanishing transition times; the transition times differ from component to component and possibly also for the direction of the state change (from low level to high level, or vice versa), because of production tolerances, environmental influences and similar reasons.

Undesired interactions may arise if multiple slave units are connected to an interface. In particular, it may happen that a certain slave unit erroneously interprets a response of another slave unit as a start signal of the master unit, but it may also be the case that other slave units erroneously interpret the response of the particular slave unit as a start signal of the master unit. In conventional $I^2C$ interfaces, this problem is eliminated through the use of two delay elements, one delay element being installed on the data input line, and one delay element on the clock line.

However, a disadvantage of this approach is that the parameters of the two delay elements, i.e., the delay times of the transition times, have different effects on the two afore-described problems, so that instead of an optimal solution, no more than a compromise is achievable when using merely two delay elements.

The problem of collisions of a plurality of bus nodes arises when slow slave units are operated at an $I^2C$ interface that is operated in normal mode (referred to as standard mode according to the $I^2C$ protocol) (100 kHz), in fast mode (according to the $I^2C$ protocol) (400 kHz), in expanded fast mode (referred to as fast mode plus (1 MHz) according to the $I^2C$ protocol), or in high speed mode according to the $I^2C$ protocol) (3.4 MHz). It can be avoided by oversampling if the logic clock of the slave unit is a high-frequency clock (>20 MHz).

SUMMARY

One object of the present invention is to provide an $I^2C$ slave interface and a method for operating an $I^2C$ slave interface, in which collisions between multiple devices on the bus are prevented, and the disadvantages of the aforementioned devices are avoided.

In accordance with the present invention, through the use of three delay elements, it is possible to arrive at a solution that is optimal within the framework of the technical specifications of the $I^2C$ protocol, since the suppression of a false start/stop signal generation is based on other parameters, especially the times according to the other independent claims, than the suppression of a false start/stop signal detection. A master unit as well as one or multiple slave unit(s) are able to be connected to the $I^2C$ interface according to the present invention.

According to the $I^2C$ protocol, an $I^2C$ interface is a serial data bus, and the clock and data line thus are serial lines. The $I^2C$ bus preferably is operated in standard mode (100 kHz), but the device according to the present invention may also be operated in one of the other modes according to the protocol.

In likewise preferred manner, the first input buffer, the second input buffer, and the output buffer are signal drivers, and the input buffers receive an analog input signal and output a digital signal when a certain threshold has been reached, while output buffers output an analog signal according to the $I^2C$ protocol specifications in response to a digital input signal. This provides the advantage of example embodiments of the present invention, to with that standard components may be used for a very simple and cost-effective device, especially a device having a modular design, which in turn allows a cost-effective adaptation to different requirements. Especially preferably, the first input buffer, the second input buffer, and the output buffer include Schmitt triggers.

The data input signal, the data output signal and the clock signal are made up of sequences of high and low potentials, thereby generating logic bits. The different potentials generated at the devices connected to the bus are generated according to conventional methods.

The first delay element, the second delay element and the third delay element preferably are conventional analog delay elements; especially preferably, they are asynchronous analog delay elements. In particular, analog delay elements integrated into the switching circuit as well as external analog delay elements may be used. According to the present invention, this advantageously makes it possible to produce the device in an uncomplicated manner using conventional components or circuits that have stood the test of time, which makes their production cost-effective and allows modifications to be made quite readily.

Preferably the third time and the fourth time, or the fifth time and the sixth time, are identical within the tolerances that are attributable to the components and/or the environment, these tolerances lying in a range of approx. 10 ns. In particular, a usual delay time of an ascending flank is approximately 250 ns, and the usual delay time of a descending flank amounts to approximately 50 ns to 100 ns. According to a further advantageous specific development, it is preferred in the present invention if the first time and the second time are identical, and/or if the third time and the fourth time differ, and/or if the fifth time and the sixth time differ, or if the times are identical or differ within their tolerances in alternation as a function of external influences.

According to a still further advantageous specific embodiment of the device of the present invention, the first delay element and the second delay element as well as the third delay element are configured so that the difference between the third time and the second time is maximized. According to the present invention, this advantageously makes it possible to solve the afore-described first problem, i.e., that a certain slave unit falsely interprets a response of another slave unit as a start signal of the master unit. The difference between the third time and the second time indicates precisely the time period by which a false start and/or stop signal detection may be suppressed.

Preferably, the first delay element and the second delay element as well as the third delay element are configured in such a way that, furthermore or additionally, they maximize the sum from the fifth time and the first time as well. According to the present invention, this advantageously makes it possible to solve the afore-described second problem, i.e., that other slave units erroneously interpret the response of the particular slave unit as a start signal of the master unit. The sum from the first time and the fifth time indicates the time period by which a false start and/or stop signal generation is suppressible.

The first delay element especially preferably is configured so that it maximizes the first time and/or the second time. According to the present invention, this advantageously makes it possible to filter transients out of the clock signal.

Especially preferably, the second delay element exclusively or additionally is configured so as to maximize the third time, or in the event that the third and the fourth time are not identical, so as to maximize the fourth time. According to the present invention, this advantageously makes it possible to filter transients from the data input signal.

The maximization of the different times or the different time periods preferably is obtained by an appropriate selection of the delay elements. Especially preferably, the delay elements are controllable, so that, depending on the connected devices, other values are set in particular. According to the present invention, this makes it possible to achieve high flexibility of the device with regard to different devices to be connected, in particular slave units, in an especially advantageous manner.

In an especially preferred manner, it is also possible to combine controllable delay elements with a sensor, so that the device implements the setting of the different times at the delay elements as a function of the properties of the various devices currently connected.

According to one advantageous embodiment of the method of the present invention, the difference from the third time and second time is maximized.

Preferably, the sum from the fifth time and the first time is maximized, either instead or in addition.

Especially preferably, the first time and/or the second time and/or the third time are/is maximized, instead or in addition.

All maximizations must be made in compliance with the I²C specifications for all times.

Another subject matter of the present invention is an application-specific integrated circuit which includes an inter-integrated circuit interface according to the other independent claims.

Using the example device of the present invention and/or the example method of the present invention, it is advantageously possible to solve the two afore-described problems, in particular, and to solve them separately of each other. In addition, it is possible to filter transients from the clock signal and/or the data input signal.

Another advantage is that the example device of the present invention is able to be produced in a simple and cost-effective manner in the form of a modular component, and that adaptations may be made in an uncomplicated manner by way of programming.

DETAILED DESCRIPTION OF EXAMPLE EMBODIMENTS

The present invention is described with reference to special developments and with reference to the attached figures, but the present invention is not limited to these example embodiments and figures. The figures are not to be interpreted in limiting form. For illustrative purposes, certain elements in the figures may be shown in enlarged or exaggerated form and not true to scale.

Figure 1:
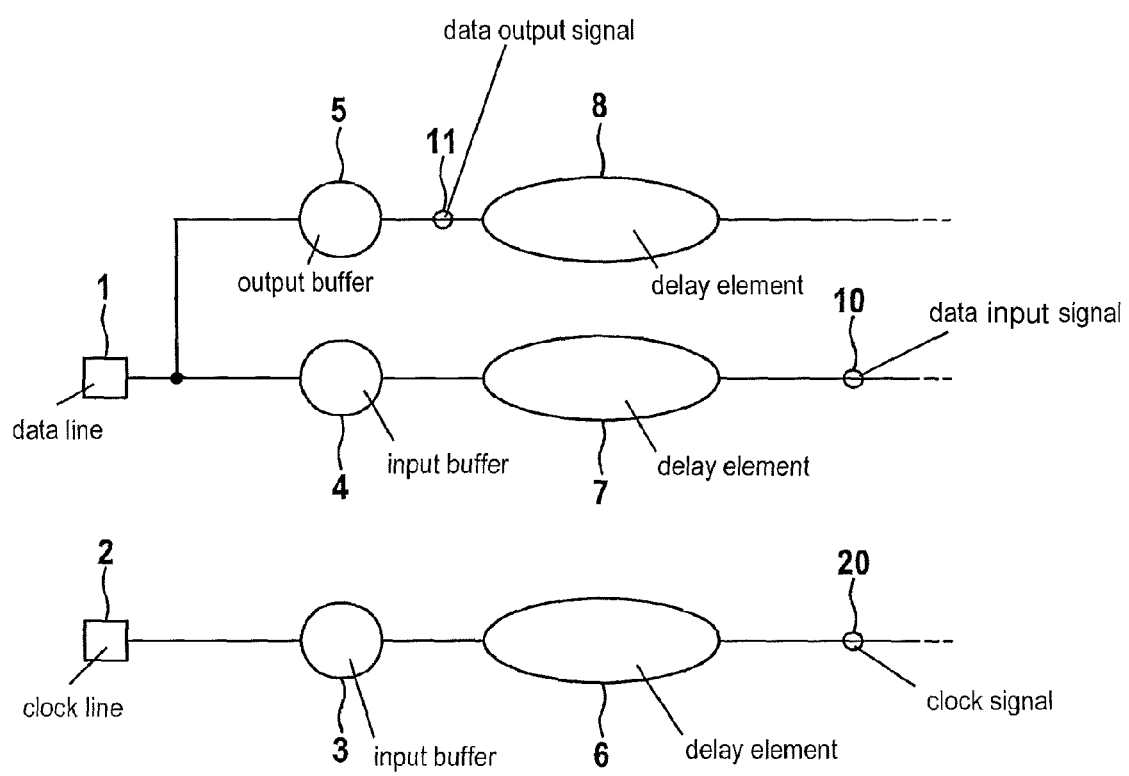
FIG. 1 schematically shows an advantageous specific embodiment of an interface in accordance with the present invention.

If not specifically stated otherwise, the use of an indefinite or definite article with reference to a word in the singular, e.g., "a", "of a", "the", also encompasses the plural of such a word. The designations "first", "second" etc. in the description and in the claims are used to distinguish similar or identical elements to be differentiated and not necessarily to describe a temporal or other sequence. The terms used in this way are basically to be considered exchangeable under corresponding conditions. FIG. 1 schematically shows an advantageous specific example embodiment of the interface according to the present invention.

A master component is not shown in FIG. 1, but would be situated to the left in FIG. 1 and connected to a data line 1 and a clock line 2. In the same way, one or more slave elements is/are not shown, but a certain slave element would be situated to the right in FIG. 1 and likewise be connected to data line 1 and clock line 2, and all other slave elements would be situated and connected in parallel to this certain slave element to the left in FIG. 1.

Data line 1 is logically split up into a data input line, via which a data input signal 10 is transmitted, and a data output line, via which a data output signal 11 is transmitted. Clock line 2, which is separate from the data line and via which a clock signal 20 is transmitted, has a first input buffer 3. Data line 1 has a second input buffer 4 and an output buffer 5. In addition, clock line 2 has a first delay element 6, and data line 1 has a second delay element 7 and a third delay element 8.

The master unit specifies clock signal 20, which in particular includes periodic signal segments of the same length, which occur at identical intervals. "Identical" in particular denotes a sameness within given tolerances.

According to the I²C protocol, the master unit initiates a data transmission by outputting a start signal, which corresponds to a switch from high level to low level on the data input line during a high potential segment on the clock line. The master thereupon outputs the address of the slave unit to be addressed, followed by information that indicates whether a read or write access to the slave unit is to take place. Then, the master or the slave unit (depending on whether a read or write access occurs) transmits an acknowledge signal which signals the start of the data transmission. The end of the transmission is announced by the master unit by a further acknowledge signal. Finally, either a stop signal indicating the end of the communication or a new start signal signaling a further data transmission may be output by the master. In addition, different points for the detection of a switch from high level to low level and for the switch from low level to high level have been specified according to the I²C protocol. Starting with a rise to 70% of the high level, a signal segment is to be detected as high level, whereas for the other direction, a signal segment is detected as low level when a drop occurs to 30% of the high level.

Further information regarding the I²C protocol may be gathered from the user guide which is available online.

The first delay element, the second delay element and the third delay element each delay an applied signal by a specific time.

Figure 2:
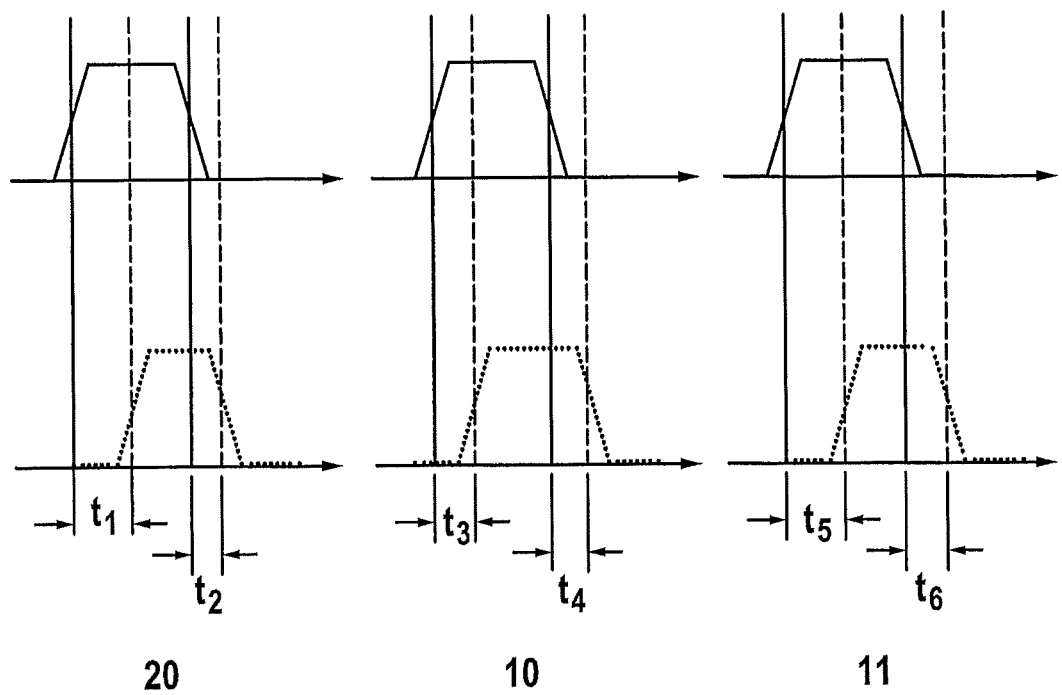
FIG. 2 schematically shows the effect of the delay elements in accordance with the present invention.

FIG. 2 shows three signal segments, in each case prior to and following the passage through first delay element 6, second delay element 7 and third delay element 8. A segment of a clock signal 20 is shown in the left column. A segment of a data input signal 10 is shown in the center column, and a segment of a data output signal 11 is shown in the right column. The original signal shape is shown in the upper region in each case, the solid lines indicating the points at which the switch from low level to high level or vice versa is detected, while the dashed lines indicate the particular point following the delay by the delay element. The signal segments following the delay are shown in the lower region. The corresponding delay times are plotted in the lower region, according to first time $t_1$, second time $t_2$, third time $t_3$, fourth time $t_4$, fifth time $t_5$, and sixth time $t_6$.

First delay element 6 delays an ascending flank of a clock signal 20 by a first time $t_1$ and a descending flank of a clock signal 20 by a second time $t_2$. Usually, the first time $t_1$ is selected so that it differs from second time $t_2$, due to the fact that second time $t_2$ is selected as small as possible within the framework of the optimal solution, whereas first time $t_1$ is selected as large as possible in order to ensure compliance with the I²C protocol or the time specifications described therein.

Second delay element 7 delays an ascending flank of a data input signal 10 by a third time $t_3$ and a descending flank of a data input signal 10 by a fourth time $t_4$. Third time $t_3$ and fourth time $t_4$ preferably are identical within the tolerances attributable to the production and environment.

Third delay element 8 delays an ascending flank of a data output signal 11 by a fifth time $t_5$ and a descending flank of a data input signal 11 by a fourth time $t_4$. Fifth time $t_5$ and sixth time $t_6$ preferably are identical within the tolerances attributable to the production and environment.

What is claimed is:

1. An inter-integrated circuit slave interface, comprising:
    a data line; and
    a clock line, the clock line having a first input buffer and the data line having a second input buffer and an output buffer, the data line for transmission of a data input signal and a data output signal, and the clock line for the transmission of a clock signal, wherein the clock line has a first delay element, and the data line has a second delay element and a third delay element, the first delay element being configured to delay an ascending flank of the clock signal by a first time and a descending flank of the clock signal by a second time, the second delay element being configured to delay an ascending flank of the data input signal by a third time and a descending flank of the data input signal by a fourth time, and the third delay element being configured to delay an ascending flank of the data output signal by a fifth time and a descending flank of the data output signal by a sixth time.

2. The inter-integrated circuit slave interface as recited in claim 1, wherein the first time and the second time differ from one another, the third time and the fourth time are identical to each other, and the fifth time and the sixth time are identical to each other.

3. The inter-integrated circuit slave interface as recited in claim 1, wherein at least one of the first input buffer, the second input buffer, and the output buffer, includes a Schmitt trigger.

4. The inter-integrated circuit slave interface as recited in claim 1, wherein at least one of the first delay element, the second delay element, and the third delay element includes an analog delay element asynchronous analog delay element.

5. The inter-integrated circuit slave interface as recited in claim 1, wherein the first delay element, the second delay element, and the third delay element are configured in such a way that while complying with the specifications of the inter-integrated circuit protocol for the first time, the second time, the third time, the fourth time, the fifth time, and the sixth time, at least one of:
    i) a difference between the third time and the second time is maximized; and
    ii) a sum of the fifth time and the first time is maximized.

6. The inter-integrated circuit slave interface as recited in claim 1, wherein the first delay element is configured in such a way that while complying with the specifications of the inter-integrated circuit protocol for the first time, the second time, the third time, the fourth time, the fifth time, and the sixth time, at least one of:
    i) at least one of the first time and the second time is maximized; and
    ii) the second delay element is configured so as to maximize the third time.

7. An application-specific integrated circuit, comprising:
    an inter-integrated circuit slave interface including a data line, and a clock line, the clock line having a first input buffer and the data line having a second input buffer and an output buffer, the data line for transmission of a data input signal and a data output signal, and the clock line for the transmission of a clock signal, wherein the clock line has a first delay element, and the data line has a second delay element and a third delay element, the first delay element being configured to delay an ascending flank of the clock signal by a first time and a descending flank of the clock signal by a second time, the second delay element being configured to delay an ascending flank of the data input signal by a third time and a descending flank of the data input signal by a fourth time, and the third delay element being configured to delay an ascending flank of the data output signal by a fifth time and a descending flank of the data output signal by a sixth time.

8. A method for operating an inter-integrated circuit slave interface having a data line and a clock line, the clock line having a first input buffer and the data line having a second input buffer and an output buffer, the data line for transmission of a data input signal and a data output signal, the clock line for transmission of a clock signal, the clock line having a first delay element, and the data line having a second delay element and a third delay element, the method comprising:
    delaying an ascending flank of the clock signal by a first time;
    delaying a descending flank of the clock signal by a second time;
    delaying an ascending flank of a data input signal by a third time;
    delaying a descending flank of a data input signal by a fourth time;
    delaying an ascending flank of a data output signal by a fifth time; and
    delaying a descending flank of a data output signal by a sixth time.

9. The method as recited in claim 8, wherein the second time differs from the first time, the fourth time is identical to the third time, and the sixth time is identical to the fifth time.

10. The method as recited in claim 8, wherein while complying with the specifications of the inter-integrated circuit protocol for the first time, the second time, the third time, the fourth time, the fifth time, and the sixth time, at least one of:

i) a difference between the third time and the second time is maximized; and ii) a sum of the fifth time and the first time is maximized.

11. The method as recited in claim 8, wherein while complying with the specifications of the inter-integrated circuit protocol for the first time, the second time, the third time, the fourth time, the fifth time and the sixth time, at least one of the first time, the second time, and the third time, is maximized.

* * * * *